K. O. & A. E. DUFVA.
GREASE CUP.
APPLICATION FILED MAR. 1, 1909. RENEWED NOV. 15, 1909.
956,761. Patented May 3, 1910.
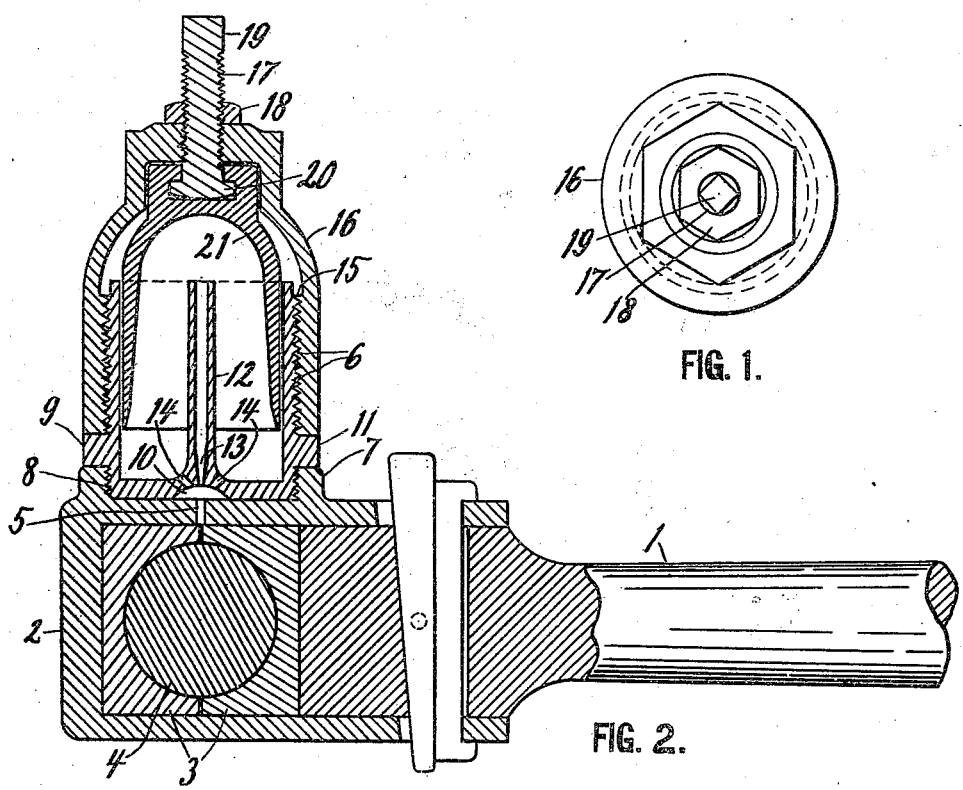
FIG. 1.
FIG. 2.
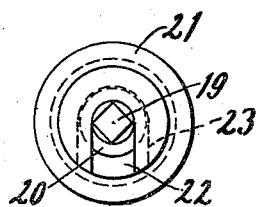
FIG. 4.
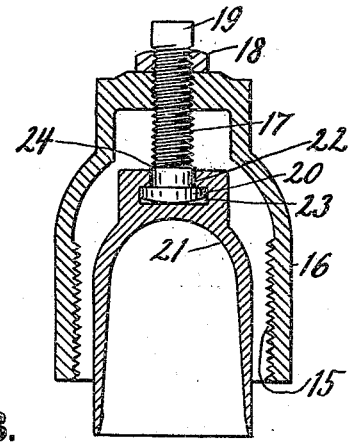
FIG. 3.
WITNESSES:
D. E. Carlsen.
E. C. Carlsen.
INVENTORS:
Knut O. Dufva
Axel E. Dufva
BY their ATTORNEY:
A. M. Carlsen.

UNITED STATES PATENT OFFICE.

KNUT O. DUFVA AND AXEL E. DUFVA, OF ST. PAUL, MINNESOTA, ASSIGNORS OF ONE-THIRD TO FREDERICK WIDMARK, OF ST. PAUL, MINNESOTA.

GREASE-CUP.

956,761.        Specification of Letters Patent.     Patented May 3, 1910.

Application filed March 1, 1909, Serial No. 480,726. Renewed November 15, 1909. Serial No. 528,144.

*To all whom it may concern:*

Be it known that we, KNUT O. DUFVA and AXEL E. DUFVA, citizens of the United States, residing at St. Paul, in the county of Ramsey and State of Minnesota, have invented a new and useful Grease-Cup, of which the following is a specification.

This invention relates to grease-cups of the class used for lubricating machinery with hard grease, and the object is to provide a grease-cup in which air pressure helps to feed the grease from the cup without, however, forcing out a large quantity of grease if the lubricated parts should run hot and liquefy the grease. This and other objects are attained by the novel construction and arrangement illustrated in the accompanying drawing, in which—

Figure 1 is a top view of the improved grease-cup. Fig. 2 is a vertical central section through the cup and connecting rod of an engine, showing the cup applied to such rod for greasing of the crank pin of an engine. Fig. 3 is the upper parts of Fig. 2 in a different position. Fig. 4 is a top view of the inner member in Fig. 3 and the feed screw in the top of same.

Referring to the drawings by reference numerals, 1 designates a connecting rod of which 2 is the strap and 3 the brasses held by the strap about a crank pin 4 of a crank (not shown). The strap 2 is provided with an oil hole 5, and surrounding the same with an internally screw-threaded hub 7 in which, for purpose of illustrating how the grease-cup may be applied, the device is screwed with the bottom end 8 of its main cup or body piece 9, said bottom end having a central cavity 10 in its lower side. It also has an external collar 11 resting on the boss 7, and is provided with external screw threads 6 from said collar to its top, while in the center of its bottom is a small central, upstanding tube 12, whose ends are open, the lower end being reduced to a small hole 13 communicating with the cavity 10, and near said tube the bottom is provided with one or more holes 14.

Engaging with the external threads 6 are the inner threads 15 of a cap 16, which is normally screwed tight against the collar 11. In the top of the cap is threaded a screw 17 having a jam nut 18, bearing on the cap, and an angular upper end 19 on which to place a wrench in turning the screw. The bottom end of the screw is provided with an inverted head or collar 20 revolubly connected with the upper end of a hollow plunger 21, which fits loosely in the body 9 and has its inner side preferably tapered toward the top which is cup-shaped and closed. The screw may be attached to the plunger in various ways but in the drawing it is shown (in Fig. 4) as let sidewise into a notch 22 having a recess 23 for the collar 20 to engage.

The operation of the cup is as follows: The body or cup proper 9, and its tube 12 are filled with tallow or similar hard grease, the cap 16 with the plunger 21 in its uppermost position is then screwed on to the body piece as in Fig. 1. This causes all the air in the plunger to become compressed in the upper end of it, and the air pressure thus created feeds the grease slowly down through the oil-holes described to the pin 4, especially as the grease in said holes usually becomes slightly warmed by the friction of the brasses 3 on the pin. But if the pin and brasses should accidentally become abnormally heated, such heat in reaching the grease-cup will first and most affect the lightest part of it, namely the tube 12, and as that tube heats it liquefies its contents and the latter is driven by the air pressure into the joint lubricated and as the compressed air escapes through the pipe thus opened, the bulk of the grease in the cup is saved from being expelled hastily after being liquefied by the heat, and as it will simply drip down from the oil holes by its own weight it will last about as long as if the joint had not been heated.

After the heated joint has been cooled off by any of the usual methods, air pressure is renewed on the grease by feeding the plunger downward by the screw 17, as indicated in Fig. 3, after the plunger has first been fully elevated so as to expel downward and into itself such grease as may have found its way into the space between the upper ends of the cap and the plunger, which space may have been enlarged by earlier downward feeding of the plunger to maintain the air pressure as the grease diminishes normally. If, however, the grease is too much diminished for thus creating the desired air pressure the cap should be removed and replaced without or still better with a new supply of grease added into the cup.

The object of having the plunger taper inside is to insure its tight fitting against the hard grease within it and thus prevent escape of the compressed air. To prevent the cap from turning the plunger by contact with it, the screw has a shoulder 24 to stop against the cap before the plunger can reach it. In some instances the tube 12, or the bell-shaped plunger 21 and its feed screw 17, or all of said elements may be omitted.

What we claim is:

1. In a grease-cup, a cup having means for securing its bottom to the part of machinery to be lubricated, a comparatively light tube extending upward from the bottom of the cup to the top of it and forming one of the outlets for the grease through the bottom of the cup, said bottom having one or more other oil holes near the tube, a cap screw-threaded downwardly upon the outer sides of the cup, a feed screw through the top of the cap, and a hollow plunger moving vertically in the cup and having its upper end closed and attached to the lower end of the feed screw.

2. In a grease-cup, a cup having means for securing its bottom to the part of machinery to be lubricated, a comparatively light tube extending upward from the bottom of the cup to the top of it and forming one of the outlets for the grease through the bottom of the cup, said bottom having one or more other oil holes near the tube, a cap screw-threaded downwardly upon the outer sides of the cup, a feed screw through the top of the cap, and a hollow plunger moving vertically in the cup and having its upper end closed and attached to the lower end of the feed screw, said screw being swivel jointed to the plunger.

3. In a grease-cup, a cup having means for securing its bottom to the part of machinery to be lubricated, a comparatively light tube extending upward from the bottom of the cup to the top of it and forming one of the outlets for the grease through the bottom of the cup, said bottom having one or more other oil holes near the tube, a cap screw-threaded downwardly upon the outer sides of the cup, a feed screw through the top of the cap, and a hollow plunger moving vertically in the cup and having its upper end closed and attached to the lower end of the feed screw, said plunger being internally tapered upward for the purpose set forth.

4. In a grease-cup, a cup having means for securing its bottom to the part of machinery to be lubricated, a comparatively light tube extending upward from the bottom of the cup to the top of it and forming one of the outlets for the grease through the bottom of the cup, said bottom having one or more other oil holes near the tube, a cap screw-threaded downwardy upon the outer sides of the cup, a feed screw through the top of the cap, and a hollow plunger moving vertically in the cup and having its upper end closed and attached to the lower end of the feed screw, said screw being swivel-jointed to the plunger; and provided with a shoulder to engage the inner side of the top of the cap to prevent contact of the plunger with the cap.

5. A grease-cup having telescoping parts screw threaded together so as to produce air pressure by screwing them together, one of the parts having outlet holes for the grease and extending inward into the cup from one of said holes an open tube for the purpose set forth.

6. A grease-cup having telescoping parts screw threaded together so as to produce air pressure by screwing them together, one of the parts having outlet holes for the grease and extending inward into the cup from one of said holes an open tube for the purpose set forth the part having the holes being provided with an external cavity by which to receive grease from all the holes and deliver it to the part to be greased.

7. In a grease-cup, a cup having means for securing its bottom to the part of machinery to be lubricated, a comparatively light tube extending upward from the bottom of the cup to the top of it and forming one of the outlets for the grease through the bottom of the cup, said bottom having one or more other oil holes near the tube, a cap screw-threaded downwardly upon the outer sides of the cup, a feed screw through the top of the cap, and a jam nut thereon, a hollow plunger moving vertically in the cup and having its upper end closed and attached to the lower end of the feed screw.

8. A grease cup comprising two telescoping hollow members screw-threaded one into the other with their closed ends outward in opposite directions, so as to form an air compressing chamber one of said members having one or more holes in its closed end for the outlet of grease, the other member having a feed screw threaded through its closed end and a bell-shaped metallic member swivel-jointed with its top to the inner end of said feed screw.

In testimony whereof we affix our signatures, in presence of two witnesses.

KNUT O. DUFVA.
AXEL E. DUFVA.

Witnesses:
A. M. CARLSEN,
D. E. CARLSEN.